(12) United States Patent
Garza

(10) Patent No.: US 11,117,516 B1
(45) Date of Patent: Sep. 14, 2021

(54) LIFT DETECTION AND ALERT ASSEMBLY

(71) Applicant: Fernando Garza, Channelview, TX (US)

(72) Inventor: Fernando Garza, Channelview, TX (US)

( * ) Notice: Subject to any disclaimer, the term of this patent is extended or adjusted under 35 U.S.C. 154(b) by 0 days.

(21) Appl. No.: 17/082,167

(22) Filed: Oct. 28, 2020

(51) Int. Cl.
| | | |
|---|---|---|
| *B60Q 9/00* | (2006.01) |
| *B60Q 5/00* | (2006.01) |
| *B60Q 1/26* | (2006.01) |
| *B60D 1/58* | (2006.01) |
| *G01C 5/00* | (2006.01) |
| *B60Q 1/46* | (2006.01) |

(52) U.S. Cl.
CPC ............... *B60Q 9/00* (2013.01); *B60D 1/58* (2013.01); *B60Q 1/2611* (2013.01); *B60Q 1/46* (2013.01); *B60Q 5/00* (2013.01); *G01C 5/00* (2013.01); *B60Q 2400/20* (2013.01)

(58) Field of Classification Search
CPC .......... B60Q 9/00; B60Q 1/46; B60Q 1/2611; B60Q 5/00; B60D 1/58; G08B 21/187
See application file for complete search history.

(56) References Cited

U.S. PATENT DOCUMENTS

| | | | |
|---|---|---|---|
| D267,818 S | 2/1983 | Lynn | |
| 5,260,688 A * | 11/1993 | Curry | G08B 21/187 212/276 |
| 5,455,567 A * | 10/1995 | Simmons | B66C 15/00 212/276 |
| 6,690,295 B1 * | 2/2004 | De Boer | G08G 5/0026 340/933 |
| 7,289,876 B2 | 10/2007 | Lussen | |
| 8,421,640 B1 * | 4/2013 | Larson | B62D 49/005 340/685 |
| 9,114,960 B2 * | 8/2015 | King | B66C 13/085 |
| 2006/0132323 A1 * | 6/2006 | Grady, Jr. | G08B 5/36 340/815.45 |
| 2006/0244577 A1 * | 11/2006 | Tanaka | B60R 25/04 340/429 |
| 2006/0261942 A1 * | 11/2006 | Frank | G01V 5/0083 340/539.26 |
| 2007/0257783 A1 * | 11/2007 | Matsumoto | B60Q 1/506 340/425.5 |
| 2008/0048872 A1 * | 2/2008 | Frank | G01V 5/0083 340/600 |

(Continued)

FOREIGN PATENT DOCUMENTS

WO      WO9320543      10/1993

*Primary Examiner* — Hoi C Lau

(57) ABSTRACT

A lift detection and alert assembly for detecting lifting of a tow vehicle and for alerting a crane operator includes an alert module and a sensing module, which are mountable to a tow vehicle having a load engaged thereto. The alert module provides notification to an operator of a crane that is engaged to and operable upon the load. The sensing module detects vertical movement of the tow vehicle and signals the alert module thereof. The alert module notifies the operator of the crane in event the tow vehicle is being lifted in conjunction with the load to prevent damage to the tow vehicle and injury to a driver thereof. The present invention is anticipated for use with terminal tractors that are utilized to move shipping containers at cargo yards, warehouse facilities, and intermodal facilities.

15 Claims, 3 Drawing Sheets

(56) References Cited

U.S. PATENT DOCUMENTS

| | | | |
|---|---|---|---|
| 2010/0141467 A1* | 6/2010 | Kirkpatrick | B60Q 1/2611 |
| | | | 340/815.45 |
| 2010/0243594 A1* | 9/2010 | King | B66C 19/007 |
| | | | 212/276 |
| 2011/0181391 A1* | 7/2011 | Chu | G06Q 10/08 |
| | | | 340/8.1 |
| 2018/0208311 A1* | 7/2018 | Zhang | G02B 27/0075 |
| 2019/0066524 A1* | 2/2019 | Zhang | G08G 5/045 |
| 2019/0283711 A1* | 9/2019 | Moran | G08B 21/02 |

* cited by examiner

LIFT DETECTION AND ALERT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to alert assemblies and more particularly pertains to a new alert assembly for detecting lifting of a tow vehicle and for alerting a crane operator.

(2) Description of Related Art Including Information Disclosed Under 37 CFR 1.97 and 1.98

The prior art relates to alert assemblies. Prior art lift detection and alert assemblies may comprise lift sensors, pulse generator driven strobe lights, and transmitters, all being engaged to tow vehicles.

BRIEF SUMMARY OF THE INVENTION

An embodiment of the disclosure meets the needs presented above by generally comprising an alert module and a sensing module, which are configured to be mountable to a tow vehicle having a load engaged thereto. The alert module is configured to provide notification to an operator of a crane that is engaged to and operable upon the load. The sensing module is configured to detect vertical movement of the tow vehicle and to signal the alert module thereof. The alert module is configured to notify the operator of the crane in event the tow vehicle is being lifted in conjunction with the load to prevent damage to the tow vehicle and injury to a driver thereof. The present invention is anticipated for use with terminal tractors that are utilized to move shipping containers at cargo yards, warehouse facilities, and intermodal facilities.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
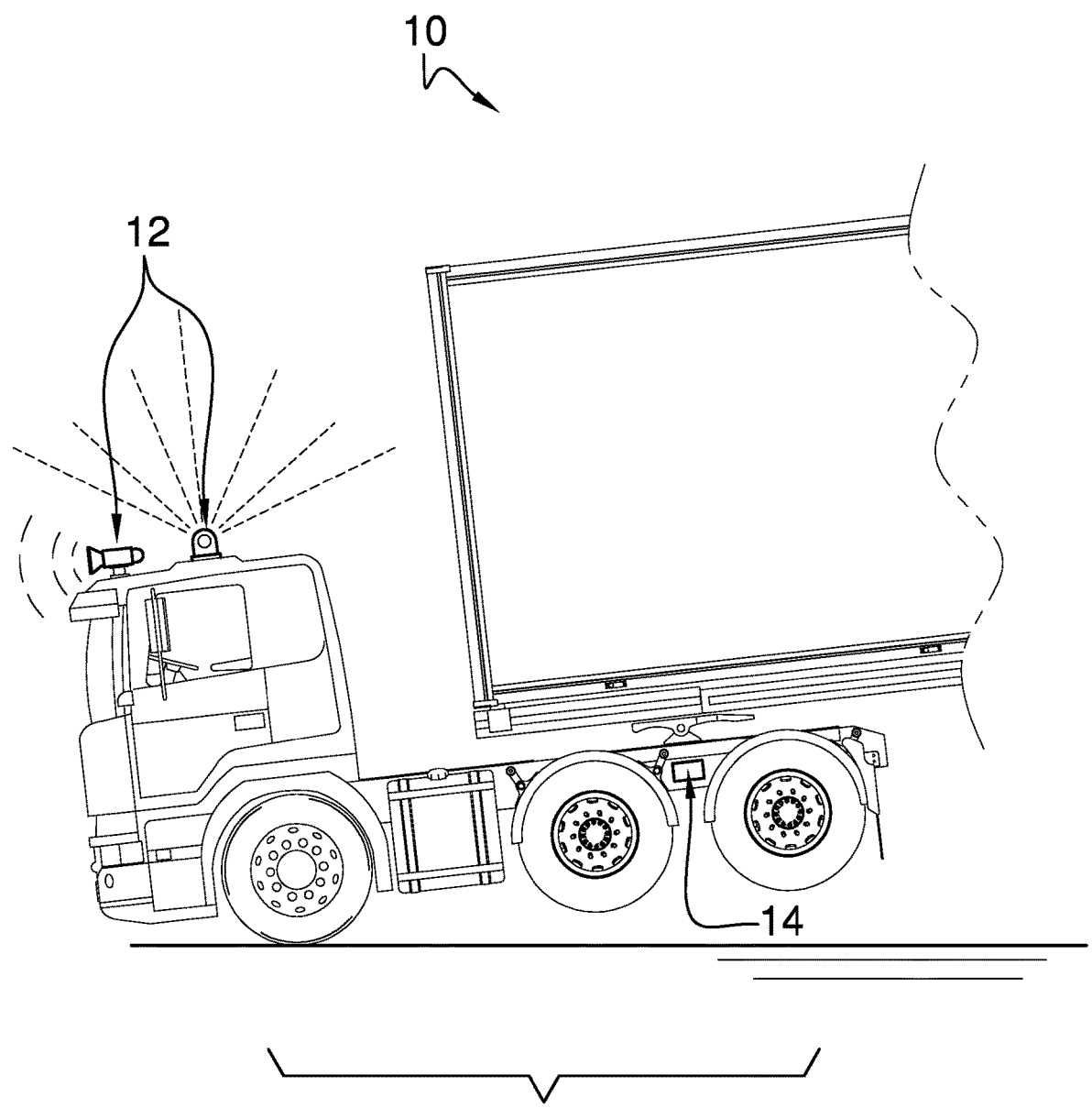
FIG. 1 is an in-use view of a lift detection and alert assembly according to an embodiment of the disclosure.
Figure 2:
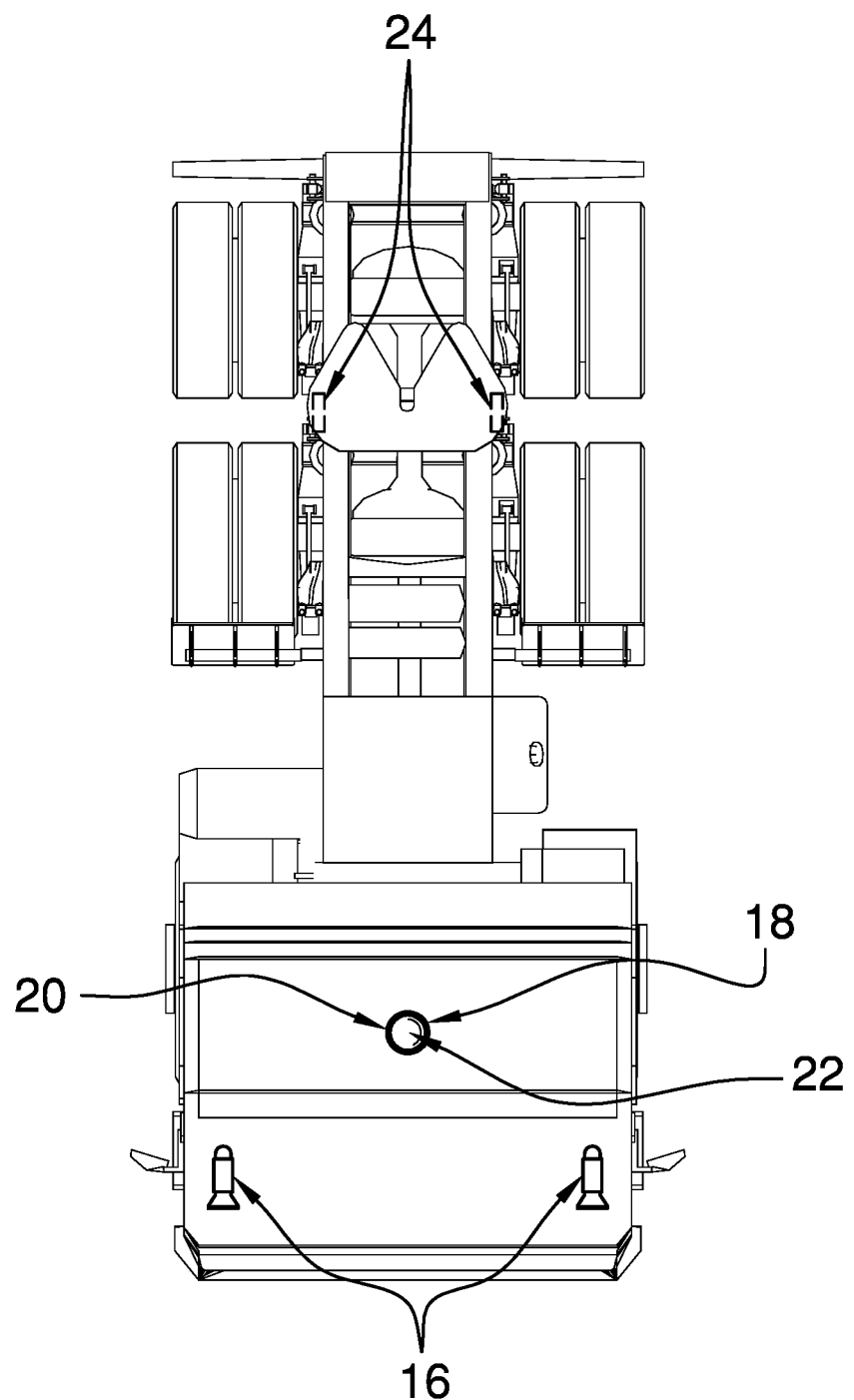
FIG. 2 is a top view of an embodiment of the disclosure.
Figure 3:
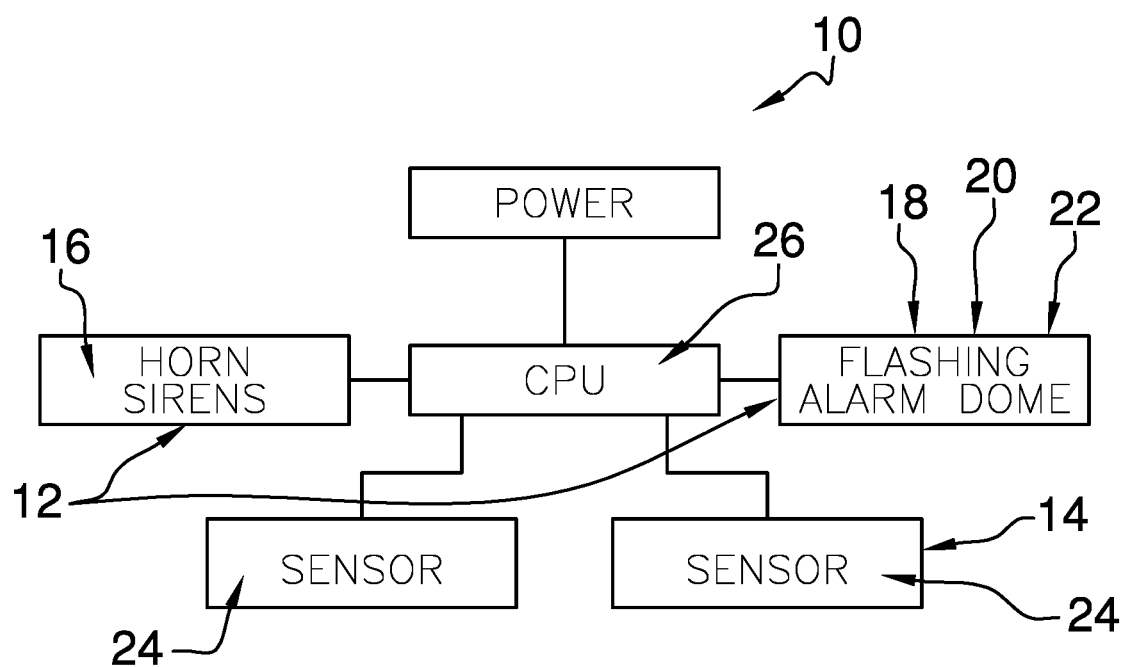
FIG. 3 is a block diagram of an embodiment of the disclosure.

With reference now to the drawings, and in particular to FIGS. 1 through 3 thereof, a new alert assembly embodying the principles and concepts of an embodiment of the disclosure and generally designated by the reference numeral 10 will be described.

As best illustrated in FIGS. 1 through 3, the lift detection and alert assembly 10 generally comprises an alert module 12 and a sensing module 14, which are configured to be mountable to a tow vehicle having a load engaged thereto. The alert module 12 and the sensing module 14 can be mounted to the vehicle utilizing mounting means such as, but not limited to, magnetic couplers, brackets, adhesives, and the like.

The alert module 12 is configured to provide notification to an operator of a crane that is engaged to and operable upon the load. The sensing module 14 is configured to detect vertical movement of the tow vehicle and to signal the alert module 12 thereof. The alert module 12 is configured to notify the operator of the crane in event the tow vehicle is being lifted in conjunction with the load to prevent damage to the tow vehicle and injury to a driver thereof. The present invention is anticipated for use with terminal tractors that are utilized to move shipping containers at cargo yards, warehouse facilities, intermodal facilities, and the like.

As shown in FIG. 2, the alert module 12 is configured to be mountable to a roof of a cab of the tow vehicle. The alert module 12 comprises at least one of a horn 16 and a bulb 18, which should be interpreted to mean only one or more horns 16, only one or more bulbs 18, or any combination thereof. The horn 16 and the bulb 18 are configured to provide an audible alert and a visual alert, respectively, to the operator of the crane, and to other persons proximate to the tow vehicle. The present invention also anticipates the alert module 12 comprising other alerting means, such as, but not limited to, visual alerting means and audio alerting means within a cab of the crane.

The horn 16 may be one of a plurality of horns 16. The plurality of horns 16 may comprise two horns 16, as shown in FIG. 2. The bulb 18 is configured for intermittent illumination. The bulb 18 may comprise a beacon light 20. The beacon light 20 may comprise a plurality of light emitting diodes 22, or other lighting means known to those skilled in the art of signal lights, such as, but not limited to, incandescent bulbs, halogen lamps, fluorescent lamps, and the like.

The sensing module 14 may comprise a set of altimeters 24. The set of altimeters 24 may comprise two altimeters 24, which are configured to be mountable to opposed sides of the tow vehicle, as shown in FIG. 2. The sensing module 14 also may comprise other sensing means to detect lifting of the tow vehicle, such as, but not limited to, proximity sensors, distance sensors, and the like.

The assembly 10 also comprises a microprocessor 26, which is configured to be operationally engaged to an electrical circuit of the tow vehicle. The microprocessor 26 is operationally engaged to the alert module 12 and the sensing module 14 and thus is positioned to selectively actuate the alert module 12 upon detection of vertical movement of the tow vehicle by the sensing module 14.

In use, the sensing module 14 and the alert module 12 are affixed to the tow vehicle. Should the sensing module 14 detect lifting of the tow vehicle while the load is being lifted from the tow vehicle, it will signal the alert module 12. The alert module 12 will activate so that the horn 16 and the bulb 18 notify the crane operator of the lifting of the tow vehicle. This allows the crane operator to terminate lifting and to lower the tow vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A lift detection and alert assembly comprising:
   an alert module configured to be mountable to a tow vehicle having a load engaged thereto, the alert module being configured for providing notification to an operator of a crane engaged to and operable upon the load; and
   a sensing module configured to be mountable to the tow vehicle, the sensing module being configured for detecting vertical movement of the tow vehicle and for signaling the alert module thereof, wherein the alert module is configured for notifying the operator of the crane in event the tow vehicle is being lifted in conjunction with the load, for preventing damage to the tow vehicle and injury to a driver thereof, wherein the sensing module comprises a set of altimeters, the set of altimeters comprising two altimeters configured to be mountable to opposed sides of the tow vehicle.

2. The lift detection and alert assembly of claim 1, wherein the alert module is configured to be mountable to a roof of a cab of the tow vehicle.

3. The lift detection and alert assembly of claim 1, wherein the alert module comprises a horn, wherein the horn is configured for providing an audible alert.

4. The lift detection and alert assembly of claim 3, wherein the horn is one of a plurality of horns.

5. The lift detection and alert assembly of claim 4, wherein the plurality of horns comprises two horns.

6. The lift detection and alert assembly of claim 1, wherein the alert module comprises a bulb, wherein the bulb is configured for providing a visual alert.

7. The lift detection and alert assembly of claim 6, wherein the bulb is configured for intermittent illumination.

8. The lift detection and alert assembly of claim 6, wherein the bulb comprises a beacon light.

9. The lift detection and alert assembly of claim 8, wherein the beacon light comprises a plurality of light emitting diodes.

10. The lift detection and alert assembly of claim 1, further including a microprocessor configured to be operationally engaged to an electrical circuit of the tow vehicle, the microprocessor being operationally engaged to the alert module and the sensing module, such that the microprocessor is positioned for selectively actuating the alert module upon detection of vertical movement of the tow vehicle by the sensing module.

11. A tow vehicle, lift detection, and alert assembly combination comprising:
   to a tow vehicle having a load engaged thereto;
   an alert module mounted to the tow vehicle, the alert module being configured for providing notification to an operator of a crane engaged to and operable upon the load; and
   a sensing module mounted to the tow vehicle, the sensing module being configured for detecting vertical movement of the tow vehicle and for signaling the alert module thereof, wherein the alert module is configured for notifying the operator of the crane in event the tow vehicle is being lifted in conjunction with the load, for preventing damage to the tow vehicle and injury to a driver thereof, wherein the sensing module comprises a set of altimeters, the set of altimeters comprising two altimeters configured to be mountable to opposed sides of the tow vehicle.

12. The tow vehicle, lift detection, and alert assembly combination of claim 11, wherein the alert module is mounted to a roof of a cab of the tow vehicle.

13. The tow vehicle, lift detection, and alert assembly combination of claim 11, wherein the alert module comprises:
   a horn, wherein the horn is configured for providing an audible alert, the horn being one of a plurality of horns, the plurality of horns comprising two horns; and
   a bulb, wherein the bulb is configured for providing a visual alert, the bulb being configured for intermittent illumination, the bulb comprising a beacon light, the beacon light comprising a plurality of light emitting diodes.

14. The tow vehicle, lift detection, and alert assembly combination of claim 11, further including a microprocessor operationally engaged to an electrical circuit of the tow vehicle, the microprocessor being operationally engaged to the alert module and the sensing module, such that the microprocessor is positioned for selectively actuating the alert module upon detection of vertical movement of the tow vehicle by the sensing module.

15. A lift detection and alert assembly comprising:

an alert module configured to be mountable to a tow vehicle having a load engaged thereto, the alert module being configured for providing notification to an operator of a crane engaged to and operable upon the load, the alert module being configured to be mountable to a roof of a cab of the tow vehicle, the alert module comprising at least one of a horn and a bulb, wherein the horn and the bulb are configured for providing an audible alert and a visual alert, respectively, the horn being one of a plurality of horns, the plurality of horns comprising two horns, the bulb being configured for intermittent illumination, the bulb comprising a beacon light, the beacon light comprising a plurality of light emitting diodes;

a sensing module configured to be mountable to the tow vehicle, the sensing module being configured for detecting vertical movement of the tow vehicle and for signaling the alert module thereof, wherein the alert module is configured for notifying the operator of the crane in event the tow vehicle is being lifted in conjunction with the load, for preventing damage to the tow vehicle and injury to a driver thereof, the sensing module comprising a set of altimeters, the set of altimeters comprising two altimeters configured to be mountable to opposed sides of the tow vehicle; and a microprocessor configured to be operationally engaged to an electrical circuit of the tow vehicle, the microprocessor being operationally engaged to the alert module and the sensing module, such that the microprocessor is positioned for selectively actuating the alert module upon detection of vertical movement of the tow vehicle by the sensing module.

* * * * *